(12) United States Patent  (10) Patent No.: US 7,545,636 B2
Wobig et al.  (45) Date of Patent: Jun. 9, 2009

(54) METHOD AND APPARATUS FOR COUPLING A DRIVE TO A CHASSIS

(75) Inventors: Eric C. Wobig, Roger Dudman Way (GB); David S. Thornton, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 331 days.

(21) Appl. No.: 11/438,577

(22) Filed: May 22, 2006

(65) Prior Publication Data

US 2007/0268661 A1    Nov. 22, 2007

(51) Int. Cl.
*H05K 7/12* (2006.01)
(52) U.S. Cl. .......................... 361/685; 29/830; 206/607
(58) Field of Classification Search ................. 455/557; 361/679–687, 724–727, 818, 816; 29/830, 29/825; 206/606–607
See application file for complete search history.

(56) References Cited

U.S. PATENT DOCUMENTS

| | | | |
|---|---|---|---|
| 6,487,081 B2 | 11/2002 | Homer et al. | |
| 6,879,495 B2 * | 4/2005 | Jiang | 361/818 |
| 6,934,119 B2 | 8/2005 | Kohyanna et al. | |
| 7,324,349 B2 * | 1/2008 | Wobig et al. | 361/756 |
| 2006/0056146 A1 | 3/2006 | Marcade et al. | |
| 2008/0090611 A1 * | 4/2008 | Mehta et al. | 455/557 |

* cited by examiner

*Primary Examiner*—Hung V Duong
(74) *Attorney, Agent, or Firm*—Haynes and Boone, LLP

(57) ABSTRACT

A drive coupling apparatus includes a carrier base defining a drive channel and comprising a first symmetry plane. A plurality of drive coupling members are located on the carrier base and adjacent the drive channel in a symmetrical orientation about the first symmetry plane. A plurality of chassis coupling members located on the carrier base in a symmetrical orientation about the first symmetry plane. The carrier base may be coupled to a drive in a plurality of different drive coupling orientations such that the carrier base may couple to an information handling system chassis and allow the drive to be coupled to an information handling system with the carrier base coupled to the drive in any of the drive coupling orientations.

19 Claims, 17 Drawing Sheets

METHOD AND APPARATUS FOR COUPLING A DRIVE TO A CHASSIS

BACKGROUND

The present disclosure relates generally to information handling systems, and more particularly to coupling a drive to an information handling system chassis.

As the value and use of information continues to increase, individuals and businesses seek additional ways to process and store information. One option is an information handling system ("IHS"). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs include drives such as, for example, mass storage devices/hard disk drives, that are coupled to an IHS chassis for use with the IHS. The coupling of these drives to the IHS raises a number of issues.

The drives are typically coupled to the IHS chassis by coupling a carrier to a drive and then coupling the carrier to the IHS chassis. The carriers are keyed so that the drive must be coupled to the carrier in an specific orientation and the carrier must be coupled to the IHS chassis in a specific orientation in order to allow the drive to be coupled to and used with the IHS.

However, it is possible to couple the carrier to the drive in an orientation other than the correct orientation. If the carrier is coupled to the drive in an incorrect orientation, the user will not be able to couple the drive to the IHS when the carrier is coupled to the IHS chassis. The user will then have to decouple the carrier from the drive and couple the carrier to the drive in the correct orientation in order to couple the carrier to the IHS chassis such that the drive can be coupled to and used with the IHS. Thus, conventional carriers allow for assembly errors that increase factory and field cycle times, thereby increasing cost.

Accordingly, it would be desirable to provide for coupling a drive to a chassis absent the disadvantages found in the prior methods discussed above.

SUMMARY

According to one embodiment, a drive coupling apparatus includes a carrier base defining a drive channel and comprising a first symmetry plane, a plurality of drive coupling members located on the carrier base and adjacent the drive channel in a symmetrical orientation about the first symmetry plane, and a plurality of chassis coupling members located on the carrier base in a symmetrical orientation about the first symmetry plane.

BRIEF DESCRIPTION OF THE DRAWINGS

FIG. 2b is a perspective view illustrating an embodiment of the carrier of FIG. 2a.

FIG. 3b is a perspective view illustrating an embodiment of the drive of FIG. 3a.

FIG. 5bb is a perspective view illustrating an embodiment of the carrier of FIGS. 2a and 2b coupled to the drive of FIGS. 3a and 3b in a second orientation.

FIG. 6b is a perspective view illustrating an embodiment of the carrier of FIG. 6a.

FIG. 8bb is a perspective view illustrating an embodiment of the carrier of FIGS. 6a and 6b coupled to the drive of FIGS. 3a and 3b in a second orientation.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
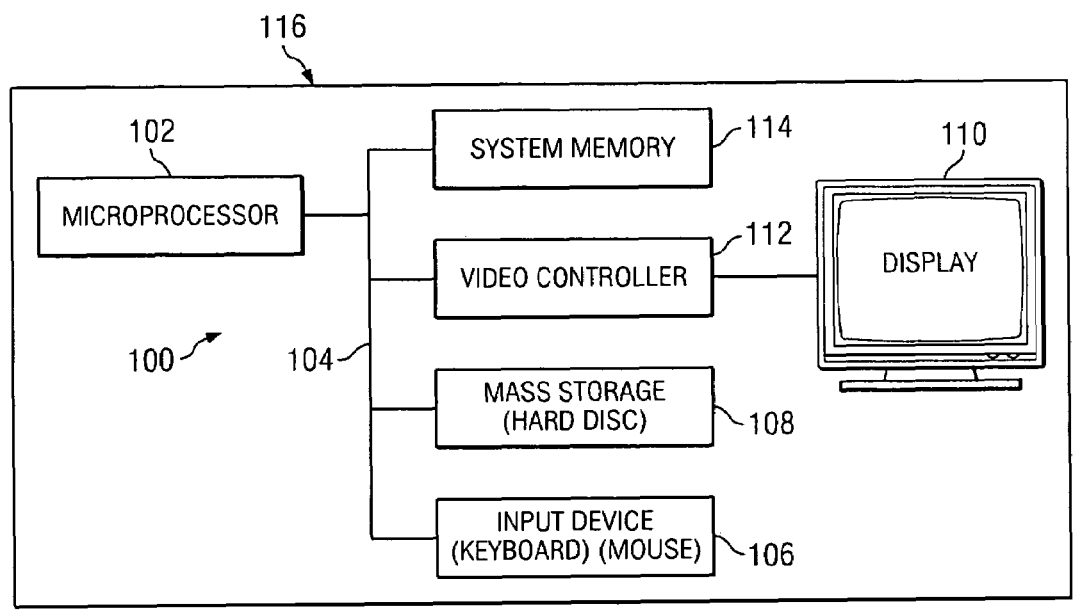
FIG. 1 is a schematic view illustrating an embodiment of an IHS.

In one embodiment, IHS 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. IHS system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of IHS 100. It should be understood that other buses and intermediate circuits can be deployed between the components described above and microprocessor 102 to facilitate interconnection between the components and the microprocessor.

Figure 2A:
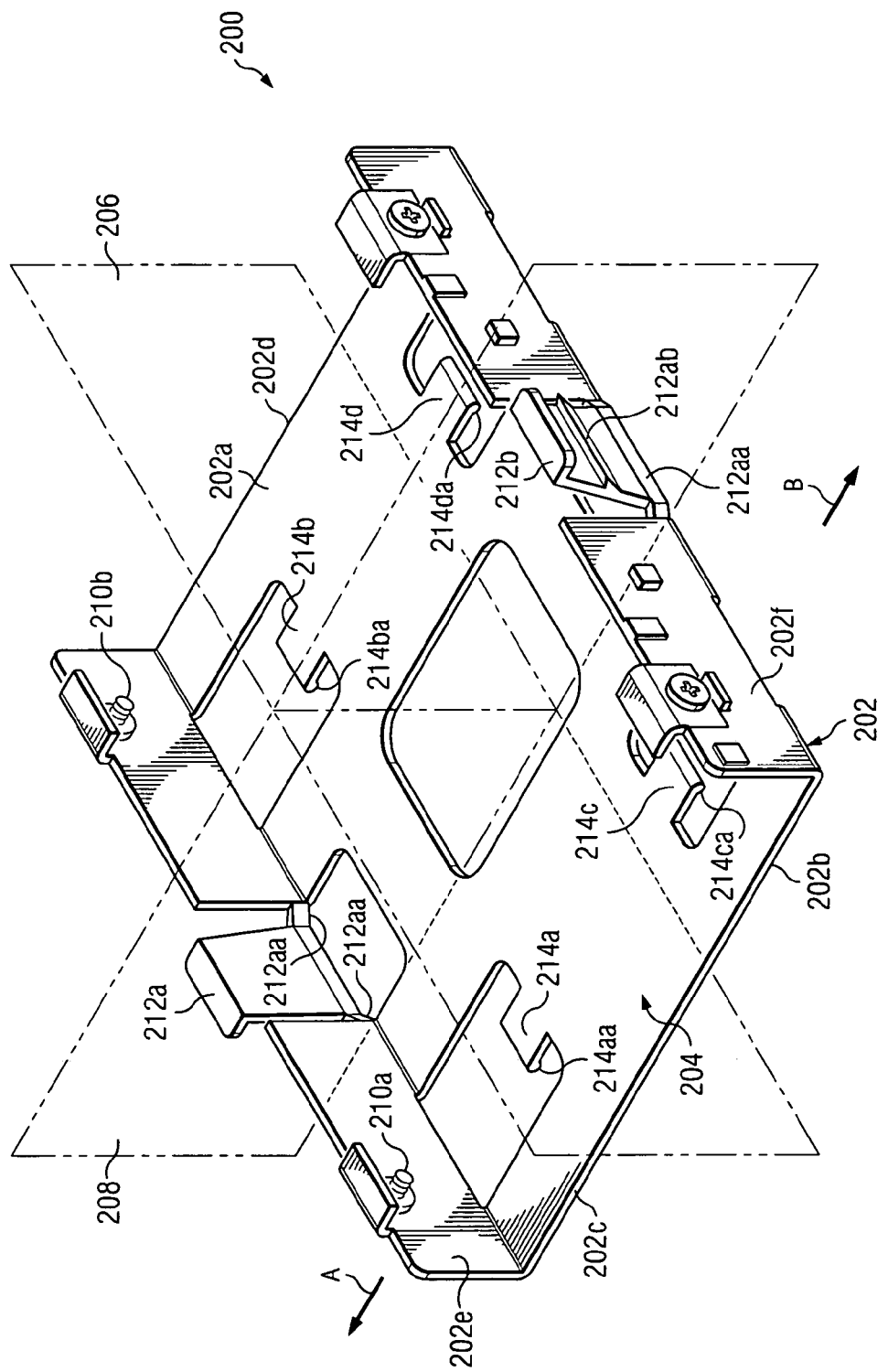
FIG. 2a is a perspective view illustrating an embodiment of a carrier.
Figure 2B:
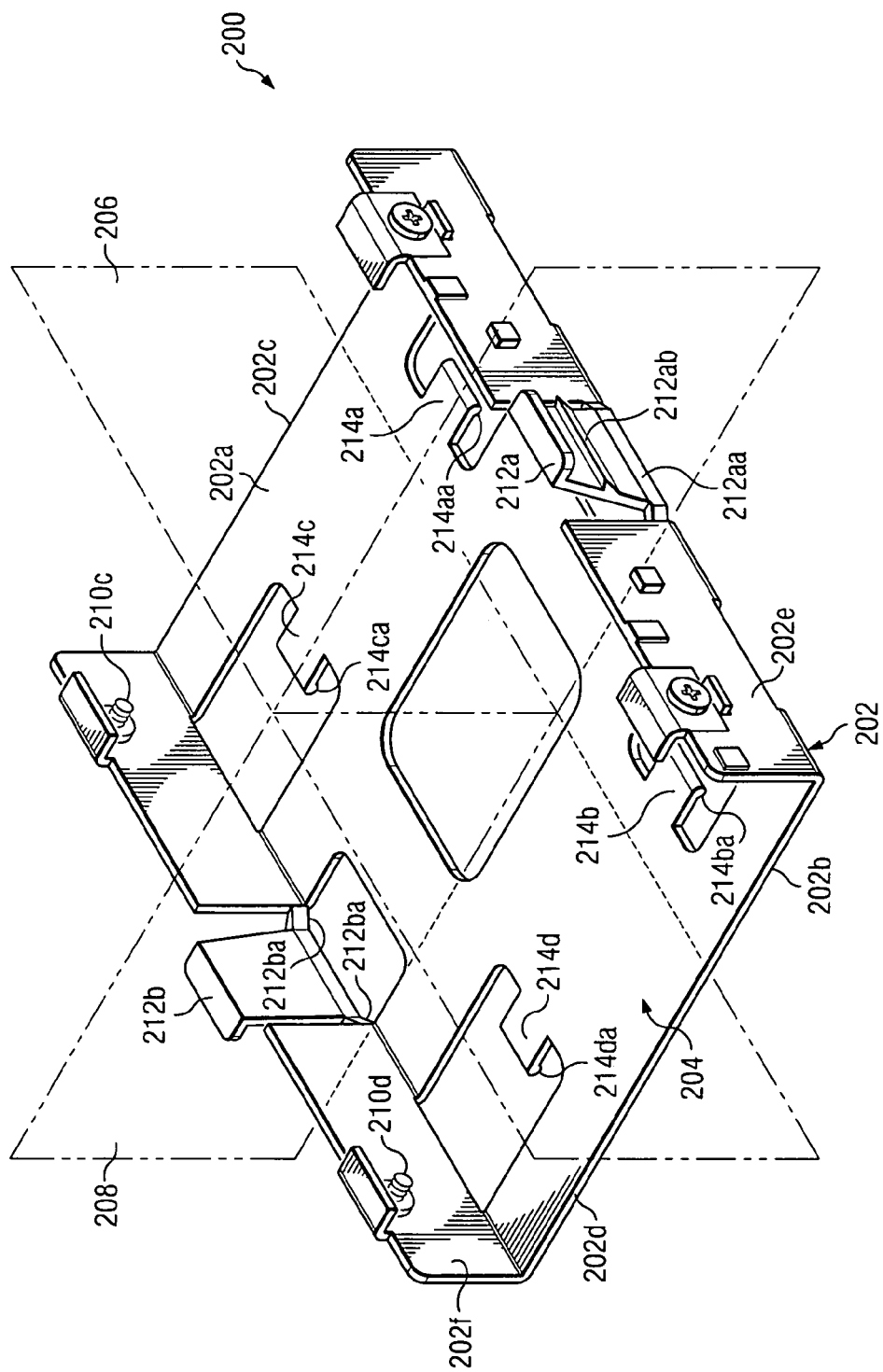

Referring now to FIGS. 2a and 2b, a carrier 200 is illustrated. The carrier 200 includes a carrier base 202 having a top surface 202a, bottom surface 202b located opposite the top surface 202a, a front surface 202c extending between the top surface 202a and the bottom surface 202b, a rear surface 202d located opposite the front surface 202c and extending between the top surface 202a and the bottom surface 202b, and a pair of side walls 202e and 202f that are located in a substantially parallel and spaced apart orientation on opposite sides of the carrier base 202 extending away from the bottom surface 202b and substantially perpendicularly to the top surface 202a. A drive channel 204 is defined by the carrier base 202 and located between the side walls 202e and 202f and the top surface 202a of the carrier base 202. A first symmetry plane 206 extends through the carrier base 202, is substantially perpendicular to the top surface 202a, the bottom surface 202b, the front surface 202c, and the rear surface 202d, is substantially parallel to the side walls 202e and 202f, and is located midway between the side walls 202e and 202f. A second symmetry plane 208 extends through the carrier base 202, is substantially perpendicular to the top surface 202a, the bottom surface 202b, the side walls 202e and 202f, and the first symmetry plane 206, is substantially parallel to the front surface 202c and the rear surface 202d, and is located midway between the front surface 202c and the rear surface 202d.

A plurality of drive coupling members 210a, 210b, 210c and 210d are located on the carrier base 202. The drive coupling members 210a and 210b extend from the side wall 202e in a spaced apart orientation from each other and into the drive channel 204. The drive coupling members 210c and 210d extend from the side wall 202f in a spaced apart orientation from each other and into the drive channel 204. The drive coupling members 210a and 210b are located on the side wall 202e and the drive coupling members 210c and 210d are located on the side wall 202f such that the drive coupling members 210a and 210b are located on the carrier base 202 in a symmetrical orientation about the first symmetry plane 206 with respect to the drive coupling members 210c and 210d. The drive coupling members 210a and 210c are located on the side walls 202e and 202f, respectively, and the drive coupling members 210b and 210d are located on the side walls 202e and 202f, respectively, such that the drive coupling members 210a and 210c are located on the carrier base 202 in a symmetrical orientation about the second symmetry plane 208 with respect to the drive coupling members 210b and 210d.

A plurality of resilient vertical chassis coupling members 212a and 212b are located on the carrier base 202. The resilient vertical chassis coupling member 212a is located substantially centrally on the side wall 202e and includes a resilient coupling 212aa to the side wall 202e and a securing member 212ab extending from its surface. The resilient vertical chassis coupling member 212b is located substantially centrally on the side wall 202f and includes a resilient coupling 212ba to the side wall 202f and a securing member 212bb extending from its surface. The resilient vertical chassis coupling member 212a is located on the side wall 202e and the resilient vertical chassis coupling member 212b is located on the side wall 202f such that the resilient vertical chassis coupling member 212a is located on the carrier base 202 in a symmetrical orientation about the first symmetry plane 206 with respect to the resilient vertical chassis coupling member 212b and the resilient vertical chassis coupling member 212a and resilient vertical chassis coupling member 212b are both symmetrical about the second symmetry plane 208.

A plurality of locating chassis coupling members 214a, 214b, 214c and 214d are located in a spaced apart orientation on the carrier base 202. The locating chassis coupling members 214a, 214b, 214c, and 214d include distal ends 214aa, 214ba, 214ca, and 214da, respectively, that extend past the bottom surface 202b. The locating chassis coupling members 214a and 214b are located on the chassis base 202 adjacent the side wall 202e and the locating chassis coupling members 214c and 214d are located on the chassis base 202 and adjacent the side wall 202f such that the locating chassis coupling members 214a and 214b are located in a symmetrical orientation about the first symmetry plane 206 with respect to the locating chassis coupling members 214c and 214d. The locating chassis coupling members 214a and 214c are located on the chassis base 202 adjacent the front surface 202c and the locating chassis coupling members 214b and 214d are located on the chassis base 202 adjacent the rear surface 202b such that the locating chassis coupling members 214a and 214c are located in a symmetrical orientation about the second symmetry plane 208 with respect to the locating chassis coupling members 214b and 214d.

Figure 3A:
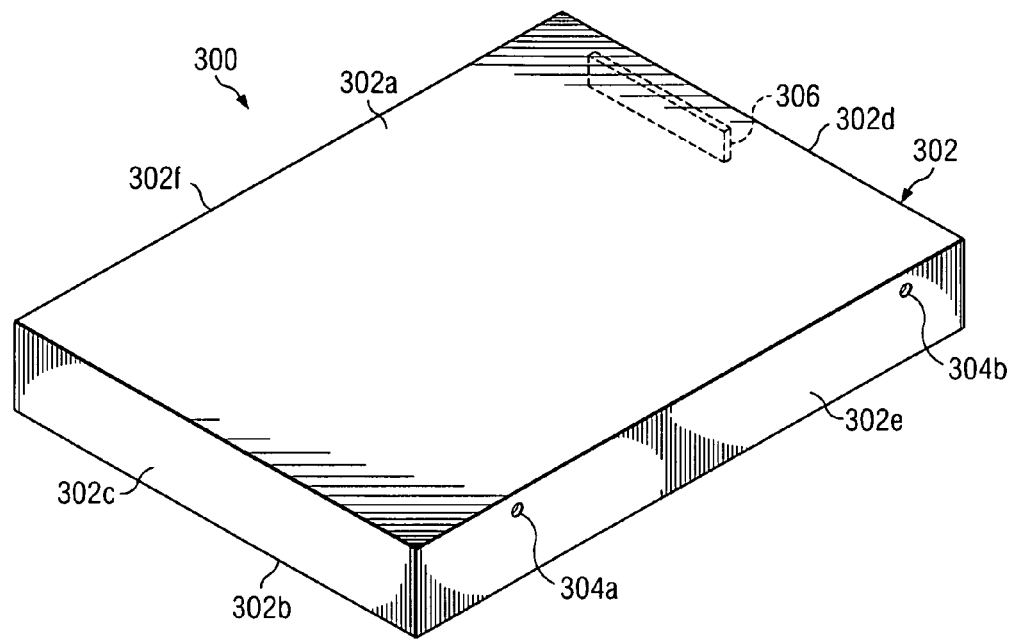
FIG. 3a is a perspective view illustrating an embodiment of a drive used with the carrier of FIGS. 2a and 2b.
Figure 3B:
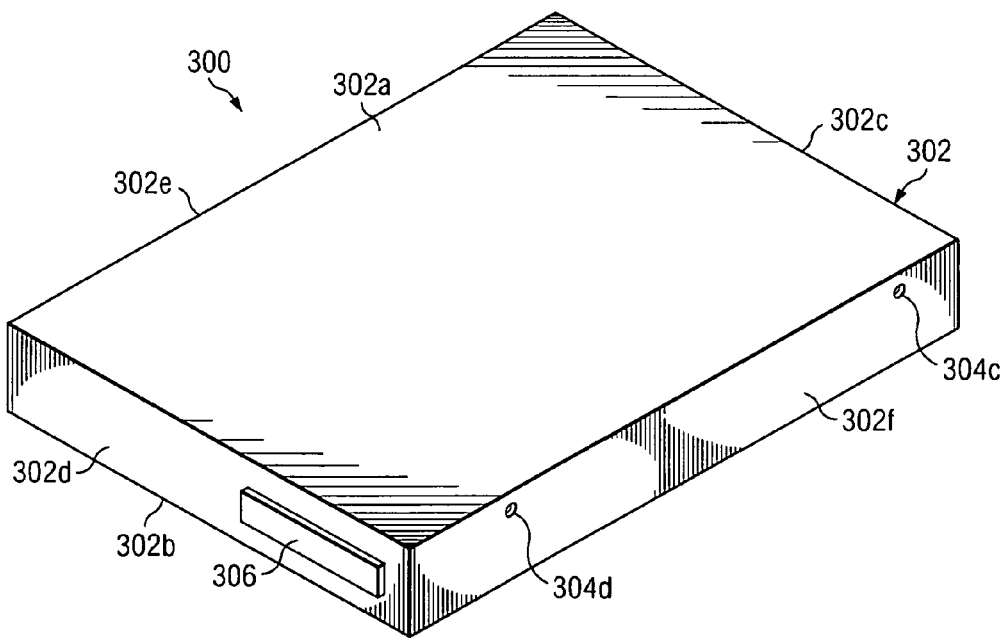

Referring now to FIGS. 3a and 3b, a drive 300 is illustrated. In an exemplary embodiment, the drive 300 may be a mass storage device and/or a hard disk drive such as, for example, the mass storage device 108 described above with reference to FIG. 1. The drive 300 includes a base 302 having a top surface 302a, a bottom surface 302b located opposite the top surface 302a, a front surface 302c extending between the top surface 302a and the bottom surface 302b, a rear surface 302d located opposite the front surface 302c and extending between the top surface 302a and the bottom surface 302b, and a pair of opposing side surfaces 302e and 302f extending between the top surface 302a, the bottom surface 302b, the front surface 302c, and the rear surface 302d. A pair of carrier coupling apertures 304a and 304b are defined by the base 302 and located in a spaced apart orientation on the side surface 302e, as illustrated in FIG. 3a. A pair of carrier coupling apertures 304c and 304d are defined by the base 302 and located in a spaced apart orientation on the side surface 302f, as illustrated in FIG. 3b. An IHS connector 306 extends from the rear surface 302d of the base 302 and is located adjacent the side surface 302f.

Figure 4:
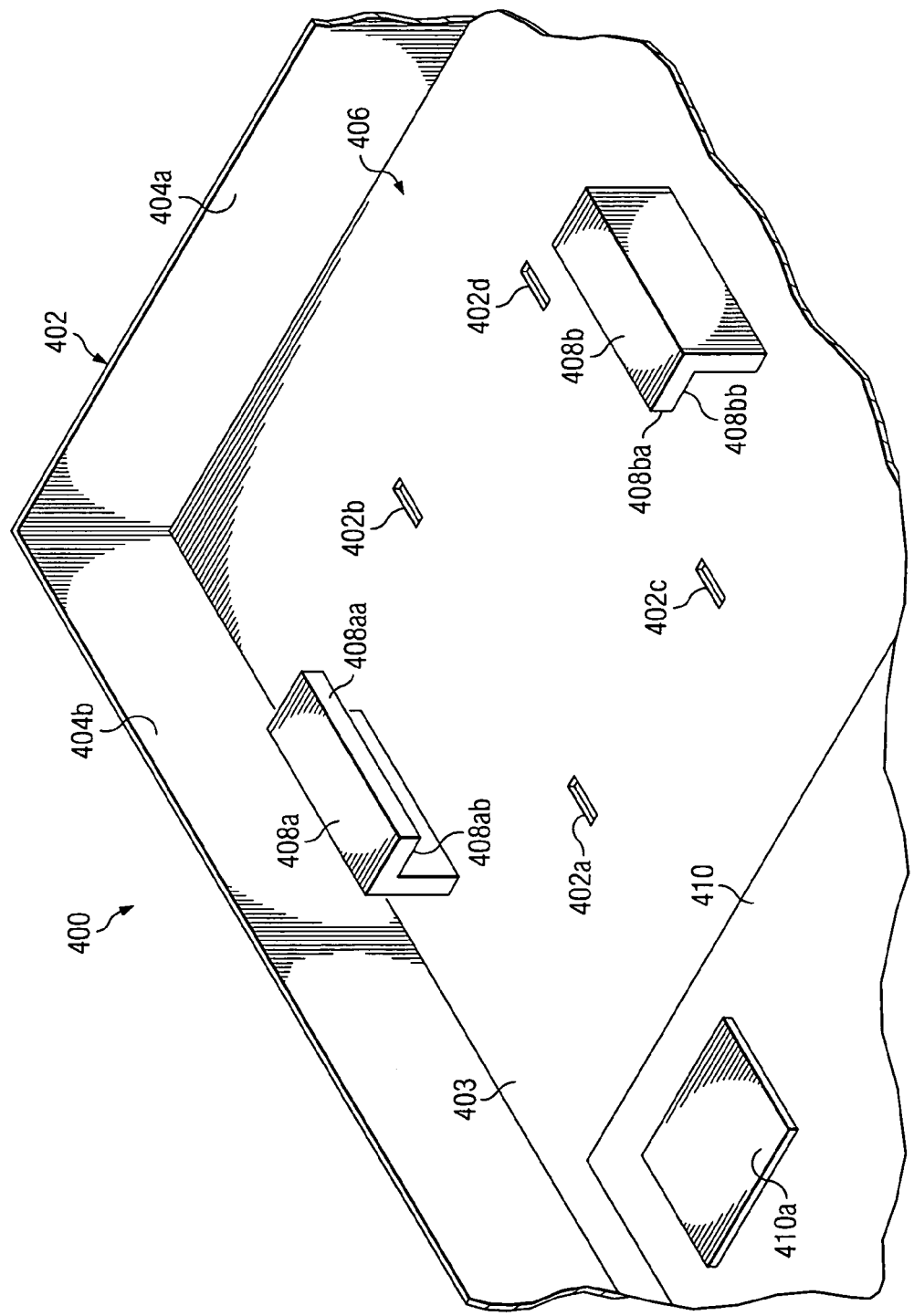
FIG. 4 is a perspective view illustrating an embodiment of an IHS chassis used with the carrier of FIGS. 2a and 2b and the drive of FIGS. 3a and 3b.

Referring now to FIG. 4, an IHS chassis 400 is illustrated. The IHS 400 may be, for example, the chassis 116 described above with reference to FIG. 1. The IHS chassis 400 includes a chassis base 402 having a drive support surface 403 and including a plurality of chassis walls 404a and 404b extending from the drive support surface 403 and defining an IHS housing 406 between themselves and the drive support surface 403. A plurality of carrier locating apertures 402a, 402b, 402c, and 402d are defined by the chassis base 402 and located in a spaced apart orientation on the drive support surface 403. A carrier coupling member 408a extends from the drive support surface 403 adjacent the carrier locating apertures 402a and 402b and includes a distal end 408aa having a securing surface 408ab. A carrier coupling member 408b extends from the drive support surface 403 adjacent the carrier locating apertures 402c and 402d, is located opposite the carrier locating apertures 402a, 402b, 402c, and 402d from the coupling member 408a, and includes a distal end 408ba having a securing surface 408bb. A board 410 is located in the IHS housing 406, coupled to the drive support surface 403, and includes a microprocessor 410a which may be, for example, the microprocessor 102 described above with reference to FIG. 1.

Referring now to FIGS. 2a, 2b, 3a, 3b, 5a, 5ba, and 5bb, a method 500 for coupling a drive to a chassis is illustrated. The method 500 begins at step 502 where the carrier 200, illustrated in FIGS. 2a and 2b, is provided. The method 500 then proceeds to step 504 where the carrier 200 is coupled to a drive in one of a plurality of orientations. The drive 300, illustrated in FIGS. 3a and 3b, is positioned above the carrier 200 such that the bottom surface 302b of the drive 300 is adjacent the top surface 202a of the carrier 200, the front surface 302c of the drive 300 is adjacent the rear surface 202d of the carrier 200, the rear surface 302d of the drive 300 is adjacent the front surface 202c of the carrier 200, the side surfaces 302e and 302f of the drive 300 are adjacent the side walls 202e and 202f, respectively, of the carrier 200, and the drive coupling members 210a, 210b, 210c and 210d on the carrier are aligned with the carrier coupling apertures 304b, 304a, 304d, and 304c, respectively, defined by the drive 300. The side walls 202e and 202f of the carrier 200 are then resiliently deflected in directions A and B respectively, as illustrated in FIG. 2a, such that the drive 300 may be positioned in the drive channel 204. When the side walls 202e and 202f are allowed to return to their non-deflected positioned, the drive coupling members 210a, 210b, 210c and 210d on the carrier 200 become positioned in the carrier coupling apertures 304b, 304a, 304d, and 304c, respectively, defined by the drive 300, coupling the carrier 200 to the drive 300 in a first orientation 504a, illustrated in FIG. 5ba.

In an embodiment, the drive 300, illustrated in FIGS. 3a and 3b, is positioned above the carrier 200 such that the bottom surface 302b of the drive 300 is adjacent the top surface 202a of the carrier 200, the front surface 302c of the drive 300 is adjacent the front surface 202c of the carrier 200, the rear surface 302d of the drive 300 is adjacent the rear surface 202d of the carrier 200, the side surfaces 302e and 302f of the drive 300 are adjacent the side walls 202f and 202e, respectively, of the carrier 200, and the drive coupling members 210a, 210b, 210c and 210d on the carrier 200 are aligned with the carrier coupling apertures 304c, 304d, 304a, and 304b, respectively, defined by the drive 300. The side walls 202e and 202f of the carrier 200 are then resiliently deflected in directions A and B respectively, as illustrated in FIG. 2a, such that the drive 300 may be positioned in the drive channel 204. When the side walls 202e and 202f are allowed to return to their non-deflected positioned, the drive coupling members 210a, 210b, 210c and 210d on the carrier 200 become positioned in the carrier coupling apertures 304c, 304d, 304a, and 304b, respectively, defined by the drive 300, coupling the carrier 200 to the drive 300 in a second orientation 504b, illustrated in FIG. 5bb.

Figure 5B:
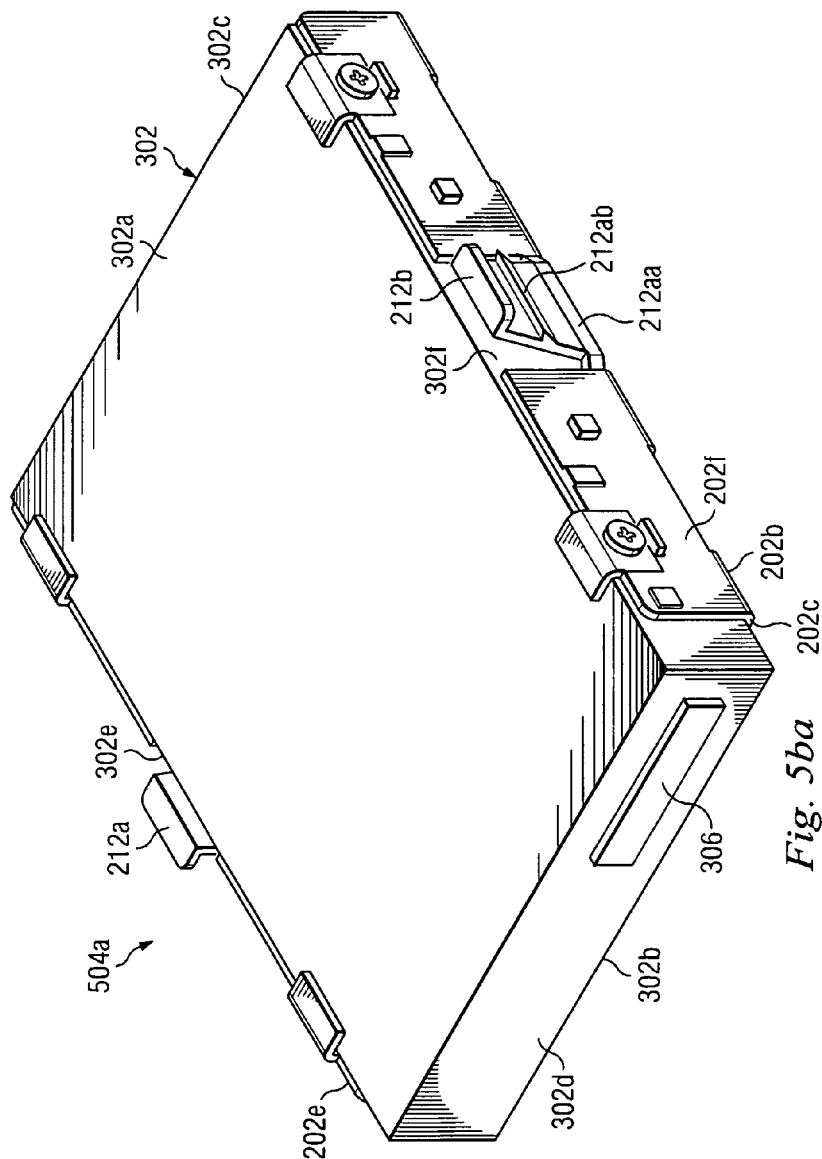
FIG. 5ba is a perspective view illustrating an embodiment of the carrier of FIGS. 2a and 2b coupled to the drive of FIGS. 3a and 3b in a first orientation.
Figure 5A:
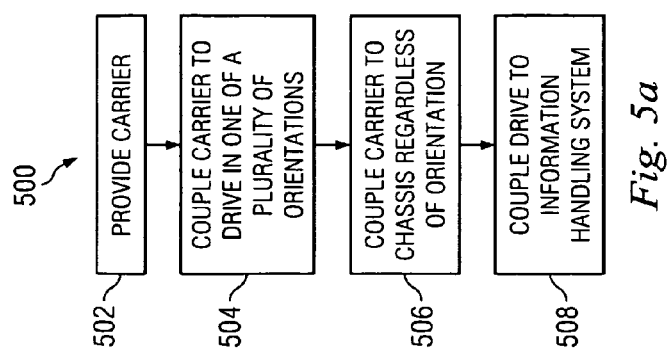
FIG. 5a is a flow chart illustrating an embodiment of a method for coupling a drive to an IHS chassis.
Figure 5B:
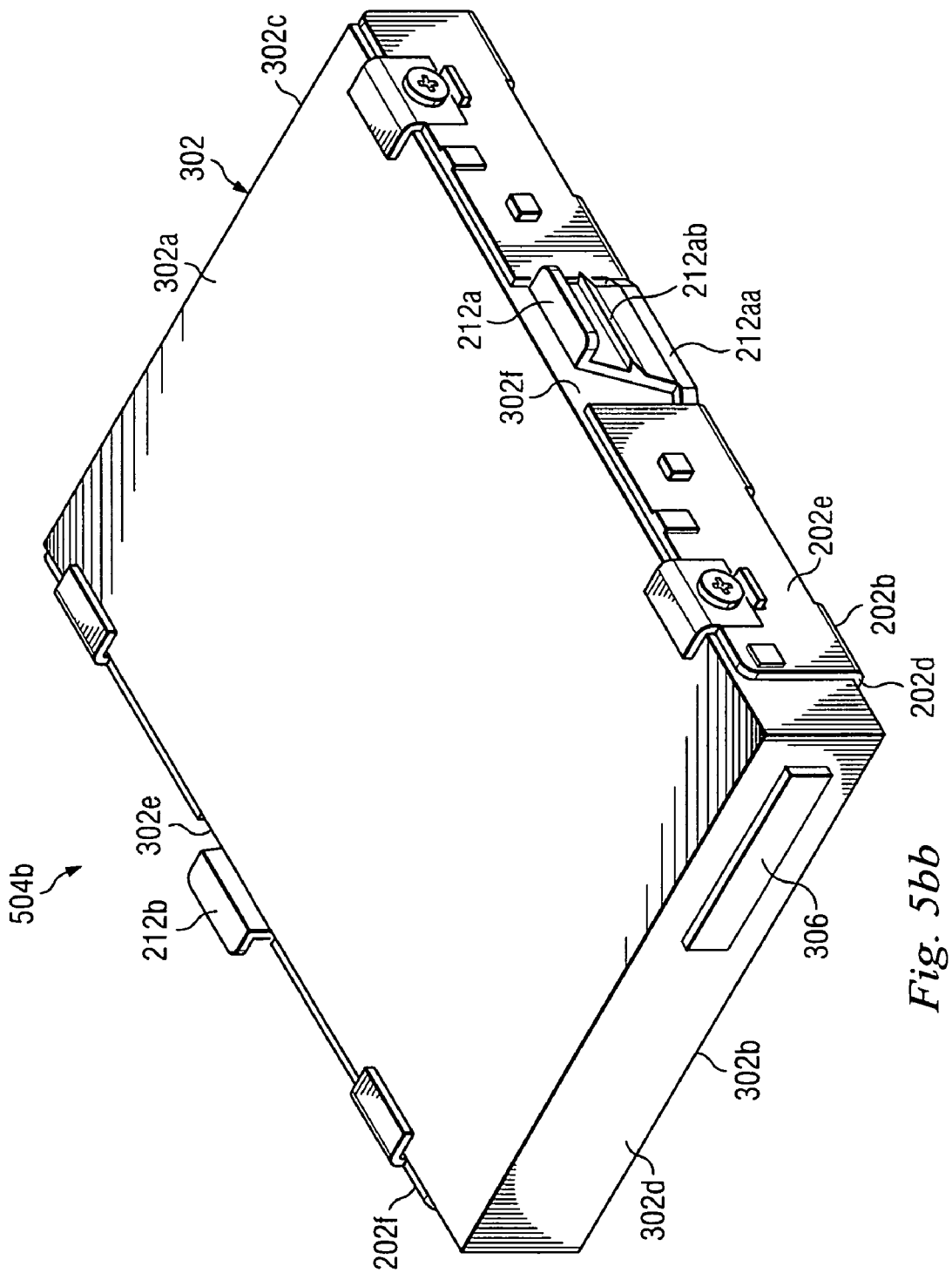

Due to the symmetrical location of the drive coupling members 210a, 210b, 210c and 210d, the resilient vertical chassis coupling members 212a and 212b, and the locating chassis coupling members 214a, 214b, 214c and 214d on the carrier 200 about the first symmetry plane 206 and the second symmetry plane 208, the location of the drive coupling members 210a, 210b, 210c and 210d, the resilient vertical chassis coupling members 212a and 212b, and the locating chassis coupling members 214a, 214b, 214c and 214d on the carrier 200 with respect to the drive 400 are the same regardless of whether the carrier 200 is coupled to the drive 300 in the first orientation 504a or the second orientation 504b, as illustrated in FIGS. 5ba and 5bb.

Figure 5C:
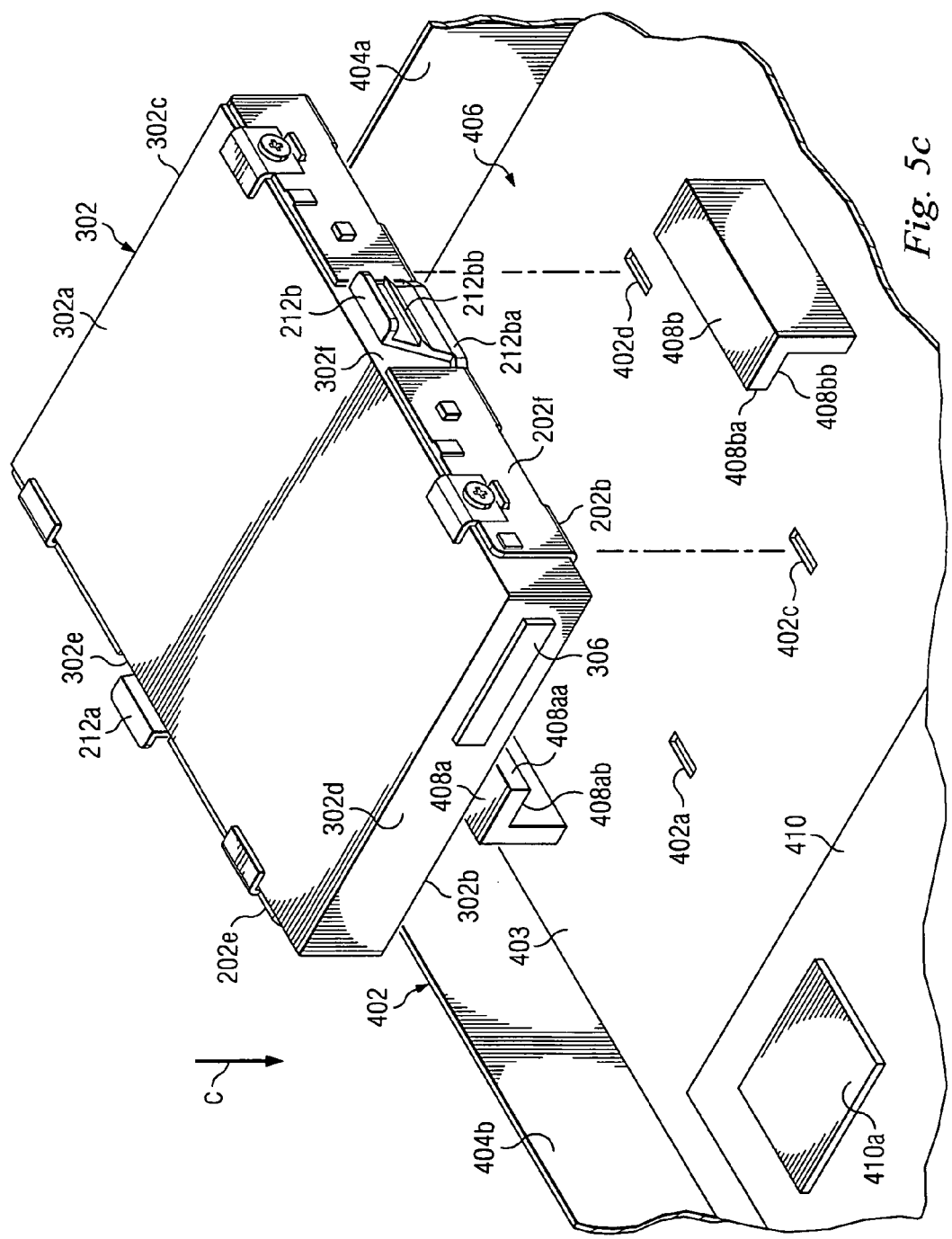
FIG. 5c is a perspective view illustrating an embodiment of the carrier and drive of FIG. 5ba being coupled to the IHS chassis of FIG. 4.
Figure 5D:
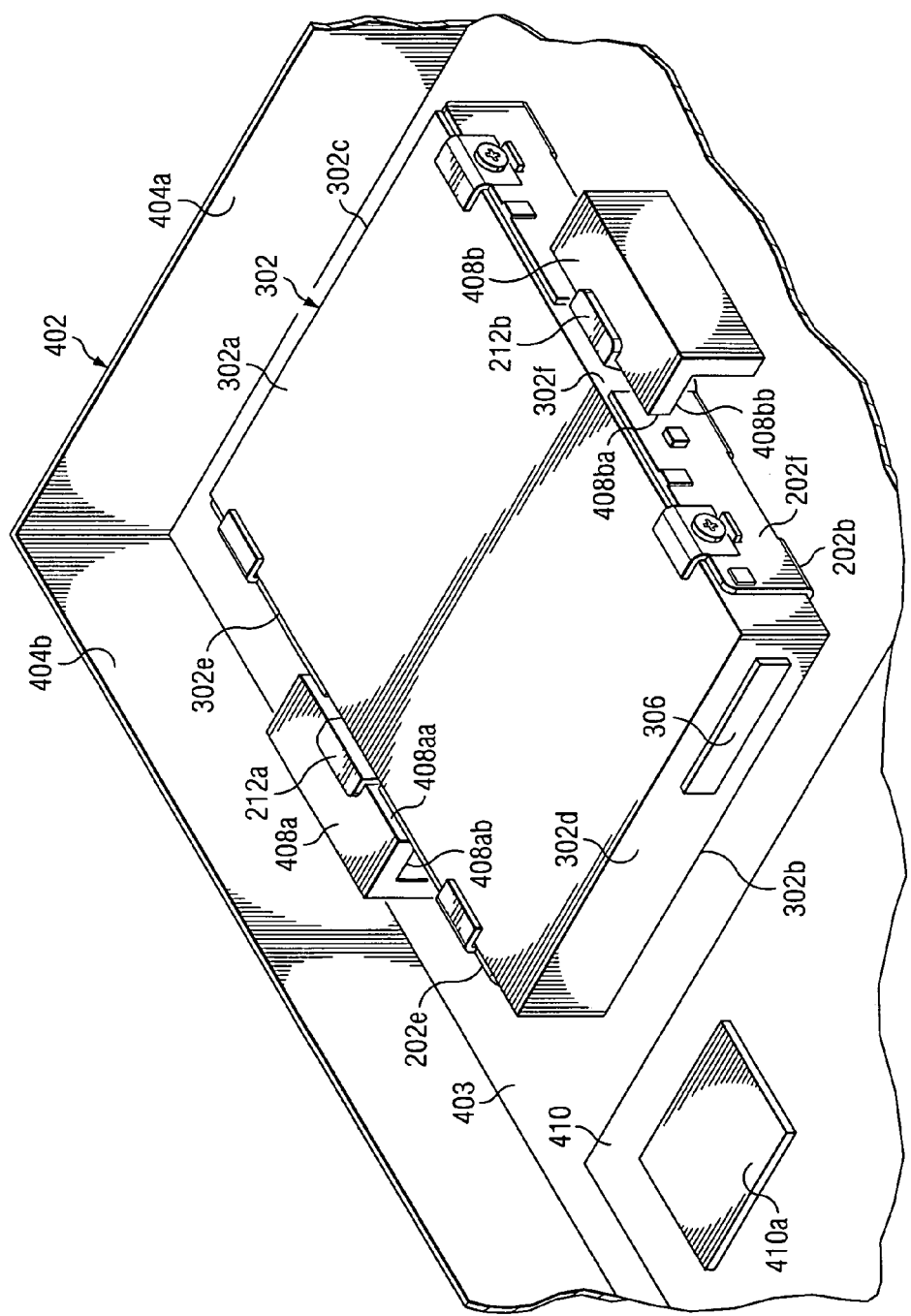
FIG. 5d is a perspective view illustrating an embodiment of the carrier and drive of FIG. 5ba coupled to the IHS chassis of FIG. 4.
Figure 5E:
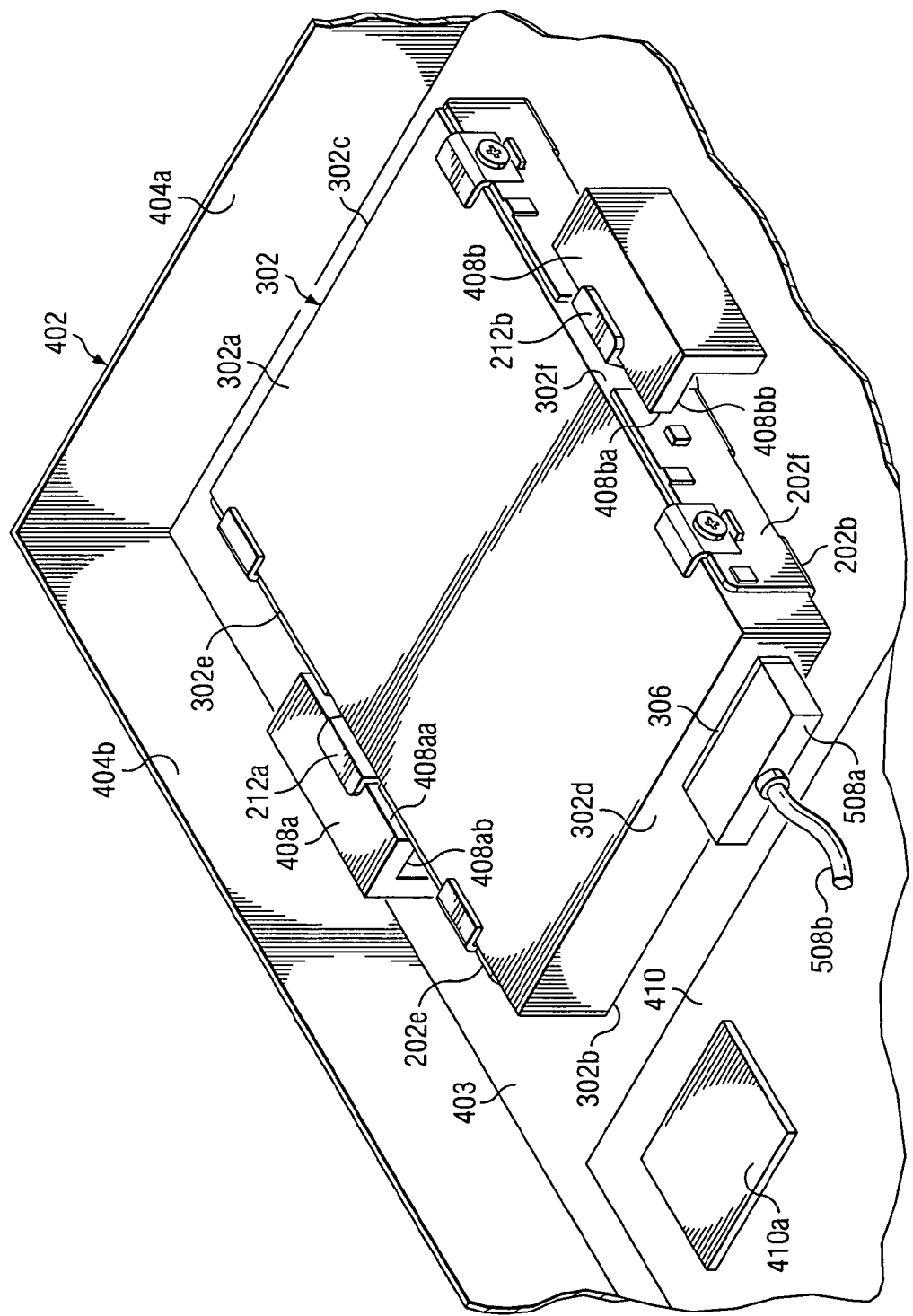
FIG. 5e is a perspective view illustrating an embodiment of the carrier, drive, and IHS chassis of FIG. 5d with the drive coupled to an IHS.

Referring now to FIGS. 2a, 2b, 4, 5a, 5ba, 5bb, 5c, 5d, and 5e, the method 500 the proceeds to step 506 where the carrier 200 is coupled to an IHS chassis regardless of the orientation of the chassis 200 on the drive 300. The carrier 200 is positioned above the IHS chassis 400, illustrated in FIG. 4, such that the bottom surface 202b of the carrier 200 is located adjacent the drive support surface 403, the resilient vertical chassis coupling member 212a is located adjacent the carrier coupling member 408a, the resilient vertical chassis coupling member 212b is located adjacent the carrier coupling member 408b, and the distal ends 214aa, 214ba, 214ca, and 214da on the locating chassis coupling members 214a, 214b, 214c and 214d, respectively, are aligned with the carrier locating apertures 402a, 402b, 402c, and 402d defined by the chassis base 402, as illustrated in FIG. 5c. The carrier 200 is then moved in a direction C such that resilient vertical chassis coupling member 212a and the resilient vertical chassis coupling member 212b are deflected towards the drive channel 204 due to their engagement with the carrier coupling members 408a and 408b, respectively, until the securing members 212ab and 212bb engage the securing surfaces 408ab and 408bb, respectively, on the distal ends 408aa and 408ba, respectively, of the carrier coupling members 408a and 408b, respectively. The distal ends 214aa, 214ba, 214ca, and 214da on the locating chassis coupling members 214a, 214b, 214c and 214d, respectively, are then engaged with the carrier locating apertures 402a, 402b, 402c, and 402d defined by the chassis base 402 such that the carrier 200 and the drive 300 are coupled to the IHS chassis 400, as illustrated in FIG. 5d. To remove the carrier 200 and the drive 300 from the IHS chassis 400, the resilient vertical chassis coupling members 212a and 212b are deflected towards the drive channel 204 to disengage the securing surfaces 212ab and 212bb from the carrier coupling members 408a and 408b, respectively, and the carrier 200 and drive 300 are moved in a direction opposite the direction designated C. While the carrier 200 has been illustrated as coupling to the IHS chassis 400 while coupled to the drive 300 in the first orientation 504a, due to the symmetrical location of the features of the carrier 200 as described above, the carrier 200 may be coupled to the IHS 400 when coupled to the drive 300 in the second orientation 504b using the same method 500 described above with the provision of the engagement of different but symmetrical features on the carrier 200 with the features on the IHS chassis 400. The method 500 then proceeds to step 508 where the drive 300 is coupled to an IHS. A connector 508a which may be coupled to the microprocessor 410a by a cable 508b is coupled to the IHS connector 306 on the drive 300, as illustrated in FIG. 5e. Thus, an apparatus and method are provided which allow a drive to be coupled to IHS chassis by a carrier regardless of the orientation of the carrier on the drive, which reduces IHS assembly errors and line assembly times. In an experimental embodiment, the average line assembly times for hard drives in IHS chassis was half that of the average time required using conventional carriers to couple hard drives to IHS chassis.

Figure 6A:
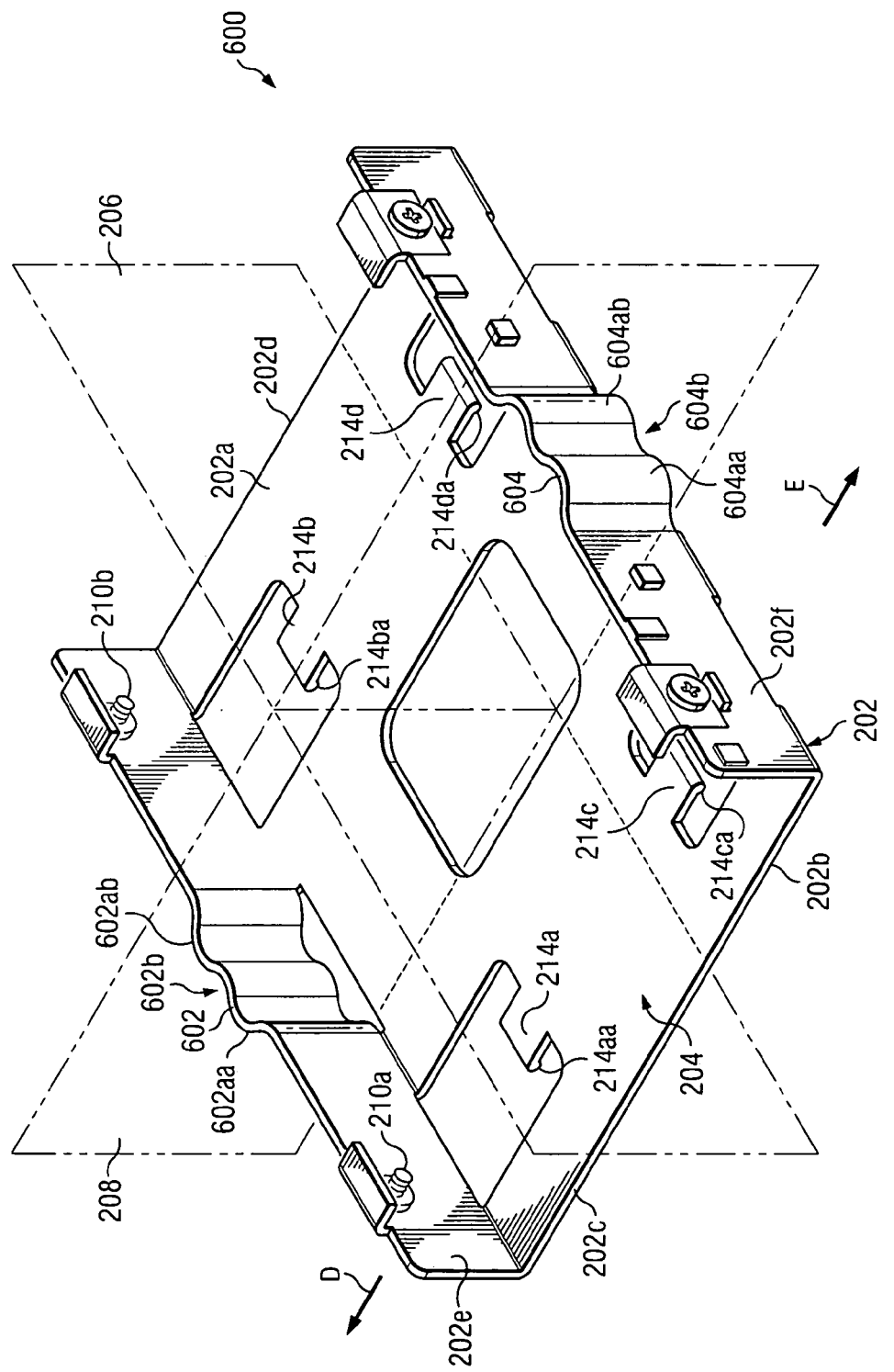
FIG. 6a is a perspective view illustrating an alternative embodiment of a carrier.
Figure 6B:
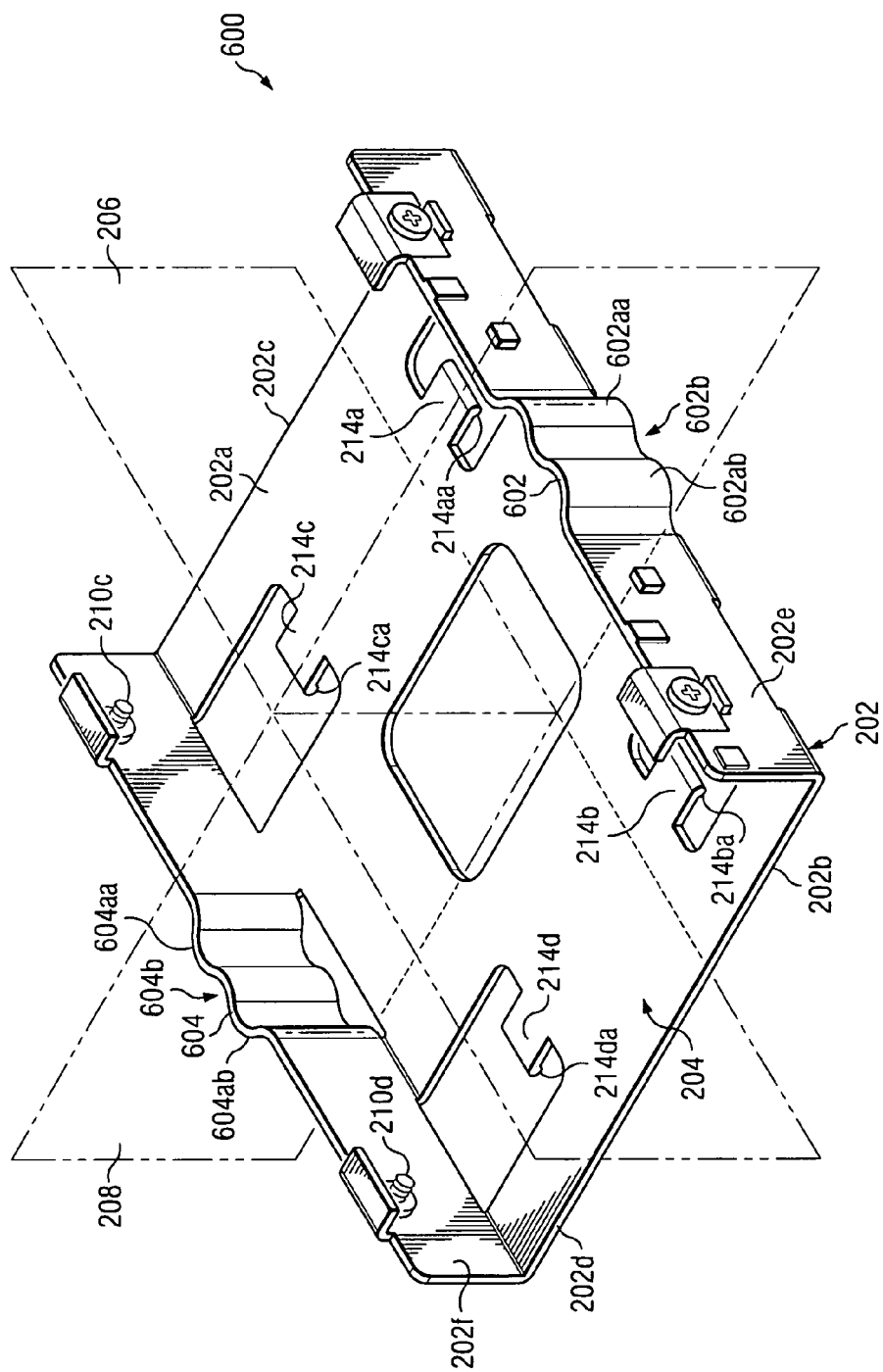

Referring now to FIGS. 6a and 6b, in an embodiment, a carrier 600 is substantially similar in design and operation to the carrier 200, described above with reference to FIGS. 2a, 2b, 5a, 5ba, 5bb, 5c, 5d, and 5e, with the provision of a plurality of resilient horizontal chassis coupling members 602 and 604 replacing the resilient vertical chassis coupling member 212a and 212b, respectively. The resilient horizontal chassis coupling members 602 is coupled to the side wall 202e and includes a plurality of engagement surfaces 602aa and 602ab and defines a securing channel 602b located between the securing surfaces 602aa and 602ab and substantially centrally on the resilient horizontal chassis coupling members 602. The resilient horizontal chassis coupling members 604 is coupled to the side wall 202f and includes a plurality of engagement surfaces 604aa and 604ab and defines a securing channel 604b located between the securing surfaces 604aa and 604ab and substantially centrally on the resilient horizontal chassis coupling members 604. The resilient horizontal chassis coupling member 602 is located on the side wall 202e and the resilient horizontal chassis coupling member 604 is located on the side wall 202f such that the resilient horizontal chassis coupling member 602 is located on the carrier base 202 in a symmetrical orientation about the first symmetry plane 206 with respect to the horizontal chassis coupling member 604 and the resilient horizontal chassis coupling member 602 and resilient horizontal chassis coupling member 604 are both symmetrical about the second symmetry plane 208.

Figure 7:
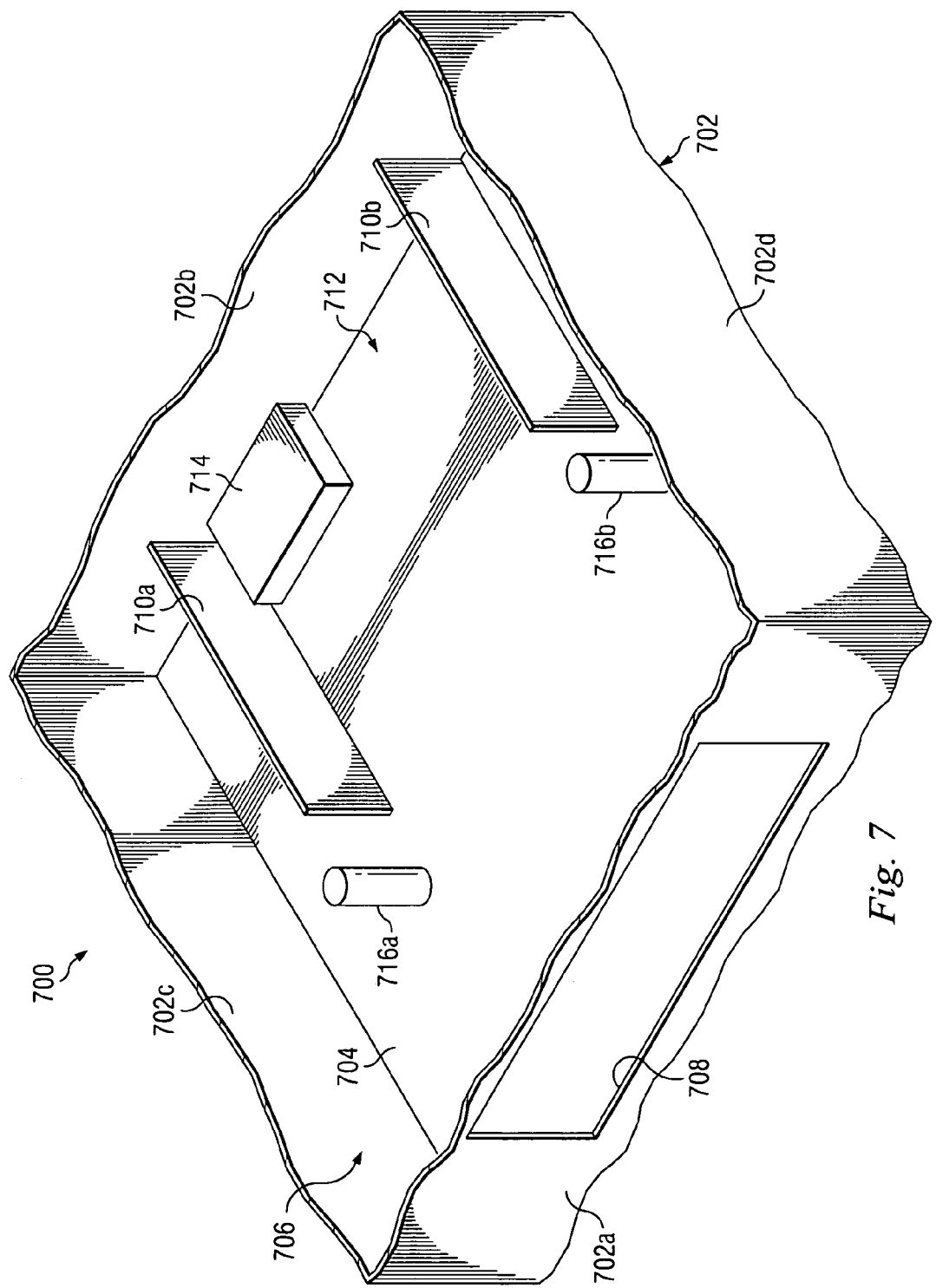
FIG. 7 is a perspective view illustrating an embodiment of an IHS chassis used with the carrier of FIGS. 6a and 6b and the drive of FIGS. 3a and 3b.

Referring now to FIG. 7, in an embodiment, an IHS chassis 700 is illustrated. The IHS chassis 700 may be, for example, the chassis 116 described above with reference to FIG. 1. The IHS chassis 700 includes a chassis base 702 having a front wall 702a, a rear wall 702b located opposite the front wall 702a, and a plurality of side walls 702c and 702d extending between the front wall 702a and the rear wall 702b. A drive support surface 704 extends between and is oriented substantially perpendicular to the front wall 702a, the rear wall 702b, and the side walls 702c and 702d. An IHS housing 706 is defined between the front wall 702a, the rear wall 702b, the sides walls 702c and 702d, and the drive support surface 704. An IHS housing entrance 708 is defined by the front wall 702 and located adjacent the drive support surface 704. A plurality of carrier guide walls 710a and 710b extend from the drive support surface 704 in a substantially parallel and spaced apart orientation and define a drive channel 712 between them. A drive connector 714 extends from the rear wall 702b of the chassis base 702, into the drive channel 712, and may be coupled to a microprocessor (not shown) such as, for example, the microprocessor 102 described above with reference to FIG. 1. A plurality of carrier coupling beams 716a and 716b extends from the drive support surface 704 adjacent the carrier guide walls 710a and 710b, respectively.

Referring now to FIGS. 6a, 6b, 7, 8a, 8ba, 8bb, 8c, and 8d, in an embodiment, a method 800 for coupling a drive to a chassis is illustrated. The method 800 begins at step 802 where the carrier 600, illustrated in FIGS. 6a and 6b, is provided. The method 800 then proceeds to step 804 where the carrier 600 is coupled to a drive in one of a plurality of orientations. The drive 300, illustrated in FIGS. 3a and 3b, is positioned above the carrier 600 such that the bottom surface 302b of the drive 300 is adjacent the top surface 202a of the carrier 600, the front surface 302c of the drive 300 is adjacent the rear surface 202d of the carrier 600, the rear surface 302d of the drive 300 is adjacent the front surface 202c of the carrier 600, the side surfaces 302e and 302f of the drive 300 are adjacent the side walls 202e and 202f, respectively, of the carrier 600, and the drive coupling members 210a, 210b, 210c and 210d on the carrier 600 are aligned with the carrier coupling apertures 304b, 304a, 304d, and 304c, respectively, defined by the drive 300. The side walls 202e and 202f of the carrier 600 are then resiliently deflected in directions D and E, respectively, as illustrated in FIG. 6a, such that the drive 300 may be positioned in the drive channel 204. When the side walls 202e and 202f are allowed to return to their non-deflected positioned, the drive coupling members 210a, 210b, 210c and 210d on the carrier 600 become positioned in the carrier coupling apertures 304b, 304a, 304d, and 304c, respectively, defined by the drive 300, coupling the carrier 600 to the drive 300 in a first orientation 804a, illustrated in FIG. 8ba.

In an embodiment, the drive 300, illustrated in FIGS. 3a and 3b, is positioned above the carrier 600 such that the bottom surface 302b of the drive 300 is adjacent the top surface 202a of the carrier 600, the front surface 302c of the drive 300 is adjacent the front surface 202c of the carrier 600, the rear surface 302d of the drive 300 is adjacent the rear surface 202d of the carrier 600, the side surfaces 302e and 302f of the drive 300 are adjacent the side walls 202f and 202e, respectively, of the carrier 600, and the drive coupling members 210a, 210b, 210c and 210d on the carrier 600 are aligned with the carrier coupling apertures 304c, 304d, 304a, and 304b, respectively, defined by the drive 300. The side walls 202e and 202f of the carrier 600 are then resiliently deflected in directions D and E respectively, as illustrated in FIG. 2a, such that the drive 300 may be positioned in the drive channel 204. When the side walls 202e and 202f are allowed to return to their non-deflected positioned, the drive coupling members 210a, 210b, 210c and 210d on the carrier 600 become positioned in the carrier coupling apertures 304c, 304d, 304a, and 304b, respectively, defined by the drive 300, coupling the carrier 600 to the drive 300 in a second orientation 804b, illustrated in FIG. 8bb.

Figure 8B:
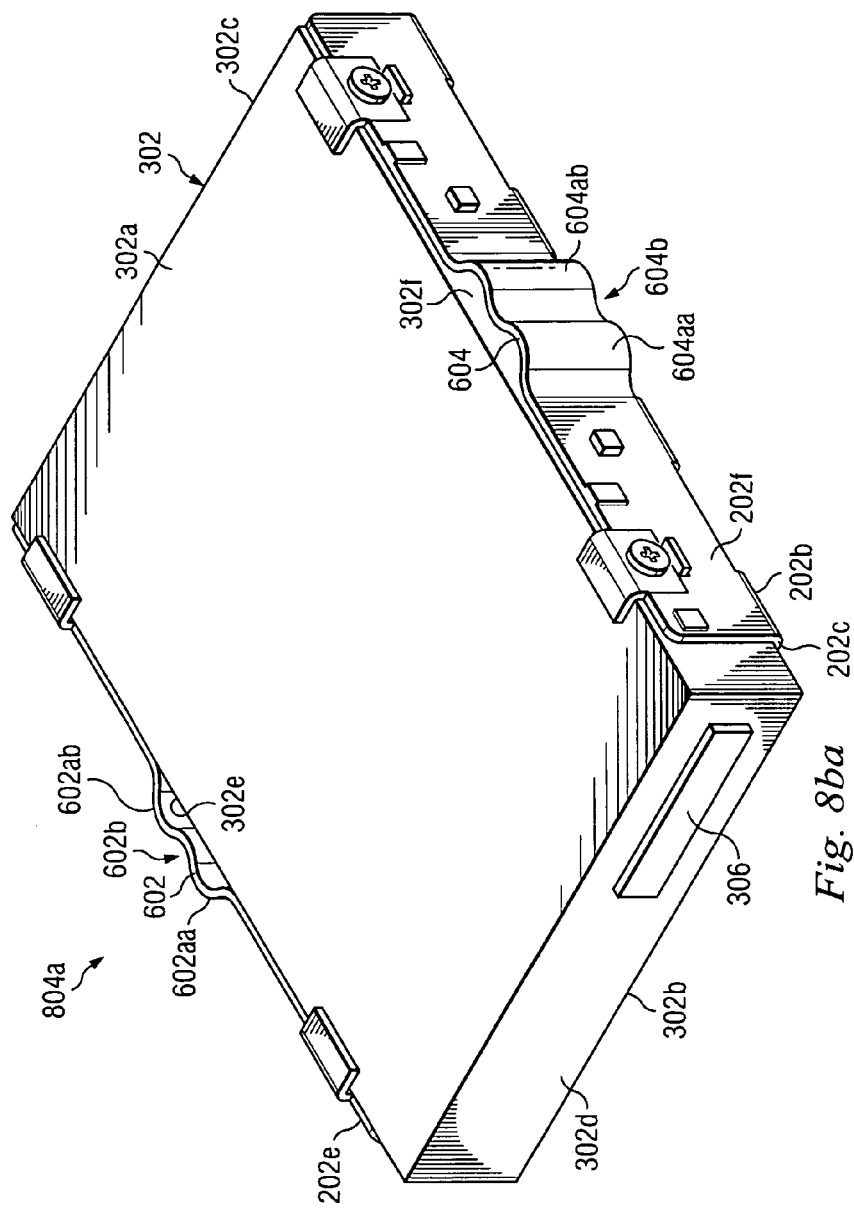
FIG. 8ba is a perspective view illustrating an embodiment of the carrier of FIGS. 6a and 6b coupled to the drive of FIGS. 3a and 3b in a first orientation.
Figure 8A:
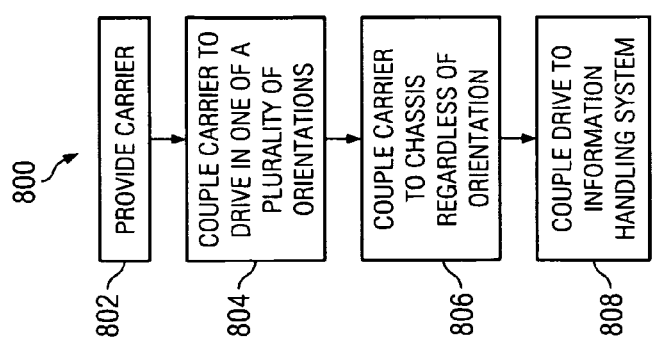
FIG. 8a is a flow chart illustrating an embodiment of a method for coupling a drive to an IHS chassis.
Figure 8B:
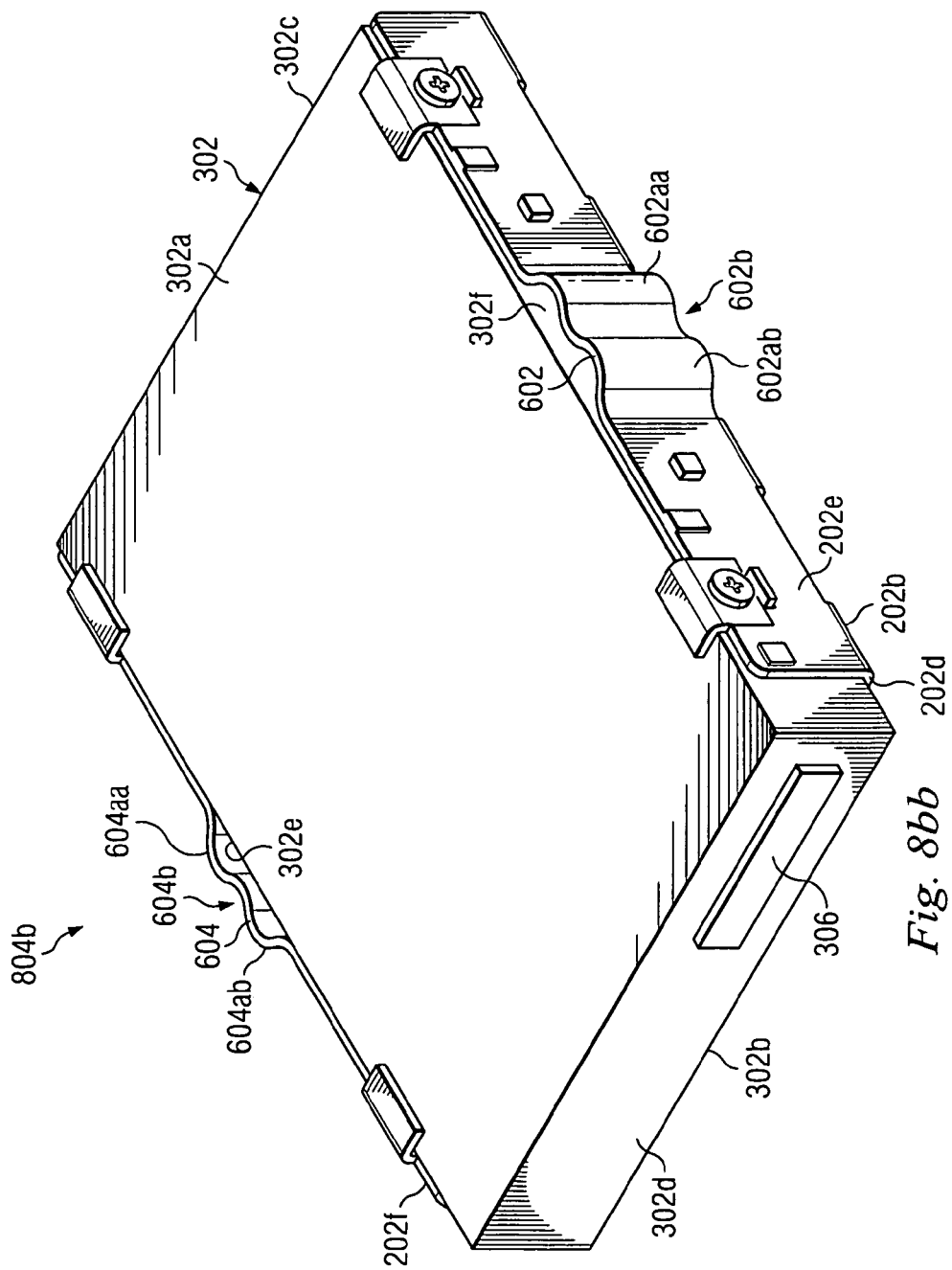

Due to the symmetrical location of the drive coupling members 210a, 210b, 210c and 210d, the resilient horizontal chassis coupling members 602 and 604, and the locating chassis coupling members 214a, 214b, 214c and 214d on the carrier 600 about the first symmetry plane 206 and the second symmetry plane 208, the location of the drive coupling members 210a, 210b, 210c and 210d, the resilient horizontal chassis coupling members 602 and 604, and the locating chassis coupling members 214a, 214b, 214c and 214d on the carrier 600 with respect to the drive 300 are the same regardless of whether the carrier 600 is coupled to the drive 300 in the first orientation 804a or the second orientation 804b, as illustrated in FIGS. 8ba and 8bb.

Figure 8C:
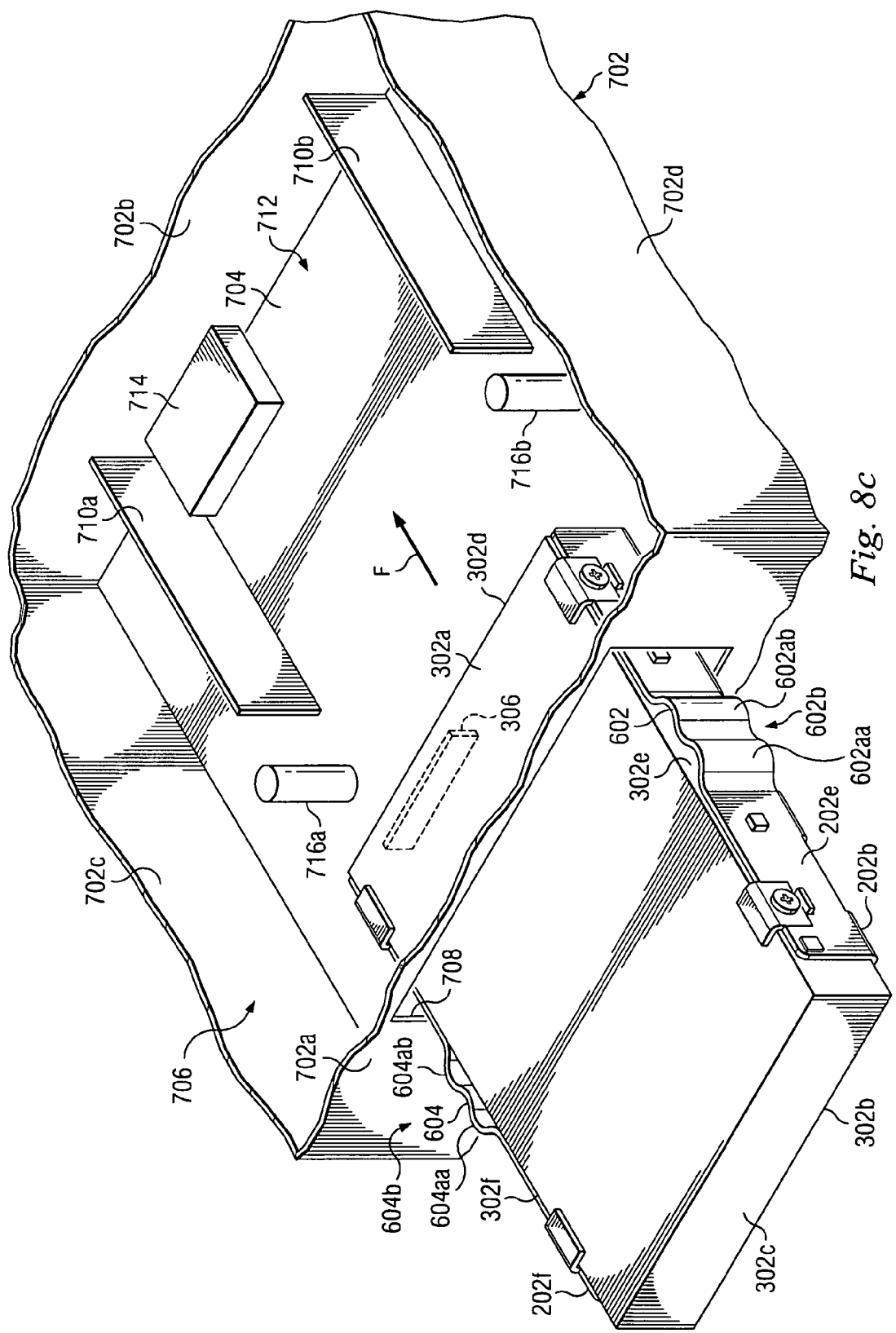
FIG. 8c is a perspective view illustrating an embodiment of the carrier and drive of FIG. 8ba being coupled to the IHS chassis of FIG. 7.
Figure 8D:
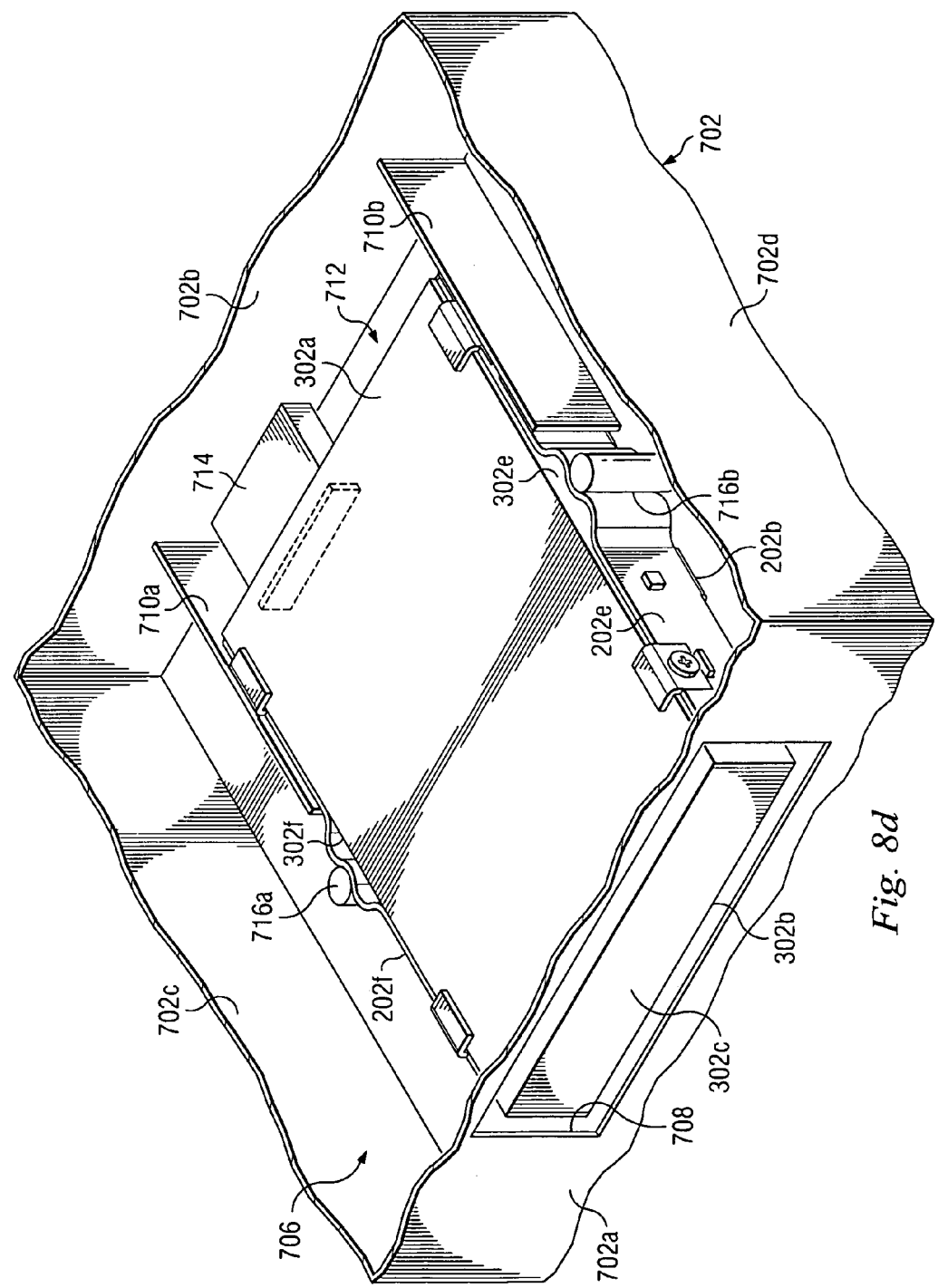
FIG. 8d is a perspective view illustrating an embodiment of the carrier and drive of FIG. 8ba coupled to the IHS chassis of FIG. 7.

The method 800 the proceeds to step 806 where the carrier 600 is coupled to an IHS chassis regardless of the orientation of the chassis 600 on the drive 300. The carrier 600 is moved through the IHS housing entrance 708 such that the rear surface 302d of the drive 300 in located in the IHS housing 706 defined by the IHS chassis 700a and the side walls 202f and 202e of the carrier 600 are adjacent the carrier coupling beams 716a and 716b, respectively, as illustrated in FIG. 8c. The carrier 600 is then moved in a direction F such that the carrier coupling beams 716a and 716b engaged the engagement surface 602ab and 604ab, respectively, on resilient horizontal chassis coupling members 602 and 604, respectively. The engagement of the carrier coupling beams 716a and 716b and the resilient horizontal chassis coupling members 602 and 604, respectively, deflects the resilient horizontal chassis coupling members 602 and 604, respectively, towards the drive channel 204 such that the carrier coupling beams 716a and 716b become located in the securing channels 602b and 604b, respectively, defined by the resilient horizontal chassis coupling members 602 and 604, respectively. Before and during the engagement of the carrier coupling beams 716a and 716b and the resilient horizontal chassis coupling members 602 and 604, respectively, the carrier guide walls 710a and 710b engage the side walls 202f and 202e, respectively, to guide the carrier 600 through the drive channel 712. To remove the carrier 600 and the drive 300 from the IHS chassis 700, the carrier 600 is moved in a direction opposite the direction F such that the resilient horizontal chassis coupling members 602 and 604 are deflected towards the drive channel due to their engagement with the carrier coupling beams 716a and 716b, respectively, allowing the coupling beams 716a and 716b to be removed from the securing channels 602b and 604b, respectively. The method 500 then proceeds to step 508 where the drive 300 is coupled to an IHS. Before and upon engagement of the carrier coupling beams 716a and 716b and the resilient horizontal chassis coupling members 602 and 604, respectively, the IHS connector 306 on the drive 300 engages the drive connector 714 on the IHS chassis 700 to coupled the drive 300 to the drive connector 714, as illustrated in FIG. 8d. Thus, an apparatus and method are provided which allow a drive to be coupled to IHS chassis by a carrier regardless of the orientation of the carrier on the drive, which reduces IHS assembly errors and line assembly times.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A drive coupling apparatus, comprising:
a carrier base defining a drive channel and comprising a first symmetry plane;
a plurality of drive coupling members located on the carrier base and adjacent the drive channel in a symmetrical orientation about the first symmetry plane; and
a plurality of chassis coupling members located on the carrier base in a symmetrical orientation about the first symmetry plane, wherein the plurality of chassis coupling members comprise a pair of resilient vertical coupling members that are located is a spaced apart orientation on the carrier base, wherein the first symmetry plane is located midway between the resilient vertical coupling members.

2. The apparatus of claim 1, wherein the carrier base comprises a pair of side walls that are located in a spaced apart orientation on the carrier base and partially define the drive channel, wherein the first symmetry plane is located midway between and parallel to the side walls and the drive coupling members extend from the side walls and into the drive channel.

3. The apparatus of claim 1, further comprising:
a second symmetry plane on the carrier base, wherein the second symmetry plane is substantially perpendicular to the first symmetry plane, whereby the plurality of drive coupling members are located in a symmetrical orientation about the second symmetry plane and the plurality of chassis coupling members are located in a symmetrical orientation about the second symmetry plane.

4. A drive coupling apparatus, comprising:
a carrier base defining a drive channel and comprising a first symmetry plane;
a plurality of drive coupling members located on the carrier base and adjacent the drive channel in a symmetrical orientation about the first symmetry plane;
a plurality of chassis coupling members located on the carrier base in a symmetrical orientation about the first symmetry plane, wherein the plurality of chassis coupling members comprise a pair of resilient horizontal coupling members that are located is a spaced apart orientation on the carrier base, wherein the first symmetry plane is located midway between the resilient horizontal coupling members; and
a hard disk drive located in the drive channel and coupled to the carrier base by the drive coupling members, whereby the symmetrical orientation of the plurality of drive coupling members and the chassis coupling members about the first symmetry plane allow the carrier base to couple to the drive in a plurality of different drive coupling orientations such that the carrier base may couple to an information handling system chassis and allow the drive to be coupled to an information handling system with the carrier base coupled to the drive in any of the drive coupling orientations.

5. A drive coupling apparatus, comprising:
a carrier base defining a drive channel and comprising a first symmetry plane;
a plurality of drive coupling members located on the carrier base and adjacent the drive channel in a symmetrical orientation about the first symmetry plane; and
a plurality of chassis coupling members located on the carrier base in a symmetrical orientation about the first symmetry plane, wherein the plurality of chassis coupling members comprise a plurality of locating chassis coupling members located in a spaced apart orientation on the carrier base, wherein the first symmetry plane is located midway between the locating chassis coupling members.

6. A drive coupling apparatus, comprising:
a carrier base defining a drive channel and comprising a first symmetry plane;
a plurality of drive coupling members located on the carrier base and adjacent the drive channel in a symmetrical orientation about the first symmetry plane;
a plurality of chassis coupling members located on the carrier base in a symmetrical orientation about the first symmetry plane; and
a hard disk drive located in the drive channel and coupled to the carrier base by the drive coupling members, whereby the symmetrical orientation of the plurality of drive coupling members and the chassis coupling members about the first symmetry plane allow the carrier base to couple to the drive in a plurality of different drive coupling orientations such that the carrier base may couple to an information handling system chassis and allow the drive to be coupled to an information handling system with the carrier base coupled to the drive in any of the drive coupling orientations.

7. An information handling system (IHS), comprising:
an IHS chassis comprising a plurality of drive coupling features;
a microprocessor coupled to the IHS chassis; and
a drive comprising a carrier and coupled to the IHS chassis by the engagement of the carrier and the drive coupling features, the carrier comprising:
 a carrier base defining a drive channel and comprising a first symmetry plane, whereby the drive is located in the drive channel;
 a plurality of drive coupling members located on the carrier base and adjacent the drive channel in a symmetrical orientation about the first symmetry plane, wherein the drive coupling members engage the drive to couple the drive to the carrier base; and
 a plurality of chassis coupling members located on the carrier base in a symmetrical orientation about the first symmetry plane, wherein the chassis coupling members engage the drive coupling features to couple the carrier base to the IHS chassis, whereby the symmetrical orientation of the plurality of drive coupling members and the chassis coupling members about the first symmetry plane allow the carrier base to couple to the drive in a plurality of different drive coupling orientations such that the carrier base may couple to the IHS chassis and allow the drive to be coupled to the IHS with the carrier base coupled to the drive in any of the drive coupling orientations.

8. The system of claim 7, wherein the carrier base comprises a pair of side walls that are located in a spaced apart orientation on the carrier base and partially define the drive channel, wherein the first symmetry plane is located midway between and parallel to the side walls and the drive coupling members extend from the side walls and into engagement with the drive in the drive channel.

9. The system of claim 7, wherein the plurality of chassis coupling members comprise a pair of resilient vertical coupling members that are located is a spaced apart orientation on the carrier base, wherein the first symmetry plane is located midway between the resilient vertical coupling members, whereby the resilient vertical coupling members engage the drive coupling features to couple the carrier base to the IHS chassis.

10. The system of claim 7, wherein the plurality of chassis coupling members comprise a pair of resilient horizontal coupling members that are located is a spaced apart orientation on the carrier base, wherein the first symmetry plane is located midway between the resilient horizontal coupling members, whereby the resilient horizontal coupling members engage the drive coupling features to couple the carrier base to the IHS chassis.

11. The system of claim 7, wherein the plurality of chassis coupling members comprise a plurality of locating chassis coupling members located in a spaced apart orientation on the carrier base, wherein the first symmetry plane is located midway between the locating chassis coupling members, whereby the plurality of locating chassis coupling members are located in corresponding locating drive coupling features defined by the IHS chassis.

12. The system of claim 7, wherein the drive comprises a hard disk drive.

13. The system of claim 7, further comprising:
a second symmetry plane on the carrier base, wherein the second symmetry plane is substantially perpendicular to the first symmetry plane, whereby the plurality of drive coupling members are located in a symmetrical orientation about the second symmetry plane and the plurality of chassis coupling members are located in a symmetrical orientation about the second symmetry plane.

14. A drive coupling apparatus, comprising:
a carrier base; and
means for coupling the carrier base to a drive in a plurality of different drive coupling orientations such that the carrier base may couple to an IHS chassis and allow the drive to be coupled to an IHS with the carrier base coupled to the drive in any of the drive coupling orientations.

15. A method for coupling a drive to a chassis, comprising:
providing a carrier;
coupling the carrier to a drive, whereby the carrier is operable to couple to the drive in a plurality of different drive coupling orientations;
coupling the carrier to an IHS chassis such that the drive may be coupled to an IHS, whereby the carrier may be coupled to the IHS chassis such that the drive may be coupled to an IHS in any of the drive coupling orientations; and
coupling the drive to an IHS.

16. The method of claim 15, wherein the coupling the carrier to an IHS chassis such that the drive may be coupled to an IHS comprises moving the carrier and drive in a direction that is substantially perpendicular to a drive support surface on the IHS chassis in order to couple the carrier to the IHS chassis.

17. The method of claim 16, wherein the coupling the carrier to an IHS chassis such that the drive may be coupled to an IHS comprises positioning a plurality of locating chassis coupling members on the carrier in corresponding locating drive coupling features defined by the IHS chassis and engaging a plurality of resilient vertical coupling members on the carrier with the IHS chassis.

18. The method of claim 15, wherein the coupling the carrier to an IHS chassis such that the drive may be coupled to an IHS comprises moving the carrier and drive in a direction that is substantially parallel to a drive support surface on the IHS chassis in order to couple the carrier to the IHS chassis.

19. The method of claim 18, wherein the coupling the carrier to an IHS chassis such that the drive may be coupled to an IHS comprises engaging a plurality of resilient horizontal coupling members on the carrier with the IHS chassis.

* * * * *